(12) United States Patent
Miller et al.

(10) Patent No.: US 7,539,727 B2
(45) Date of Patent: May 26, 2009

(54) INSTANT MESSAGING OBJECT STORE

(75) Inventors: David Michael Miller, Redmond, WA (US); John Holmes, Redmond, WA (US); Walter VonKoch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 10/611,599

(22) Filed: Jul. 1, 2003

(65) Prior Publication Data

US 2005/0004993 A1  Jan. 6, 2005

(51) Int. Cl.
G06F 15/16 (2006.01)

(52) U.S. Cl. ............... 709/206; 709/207; 709/217; 709/226; 707/10

(58) Field of Classification Search .......... 709/226, 709/228, 205–207, 217; 707/10, 101; 711/216
See application file for complete search history.

(56) References Cited

U.S. PATENT DOCUMENTS

| | | | |
|---|---|---|---|
| 5,278,955 A | 1/1994 | Forte et al. | |
| 5,987,515 A | 11/1999 | Ratcliff et al. | |
| 6,003,088 A | 12/1999 | Houston et al. | |
| 6,252,588 B1 | 6/2001 | Dawson | |
| 6,292,880 B1 * | 9/2001 | Mattis et al. | 711/216 |
| 6,434,568 B1 | 8/2002 | Bowman-Amuah | |
| 6,453,294 B1 | 9/2002 | Dutta et al. | |
| 6,463,078 B1 | 10/2002 | Engstrom et al. | |
| 6,490,615 B1 | 12/2002 | Dias et al. | |
| 6,535,867 B1 * | 3/2003 | Waters | 709/226 |
| 6,549,937 B1 | 4/2003 | Auerbach et al. | |
| 6,594,665 B1 * | 7/2003 | Sowa et al. | 707/10 |
| 6,610,104 B1 | 8/2003 | Lin et al. | |
| 6,629,793 B1 | 10/2003 | Miller | |
| 6,813,690 B1 * | 11/2004 | Lango et al. | 711/113 |
| 7,013,327 B1 | 3/2006 | Hickman et al. | |
| 7,031,956 B1 | 4/2006 | Lee et al. | |
| 7,080,139 B1 | 7/2006 | Briggs et al. | |

(Continued)

FOREIGN PATENT DOCUMENTS

EP   0665670   8/1995

(Continued)

OTHER PUBLICATIONS

U.S. Appl. No. 10/611,575; Holmes, et al.; filed Jul. 1, 2003.

(Continued)

*Primary Examiner*—Ramy M Osman
(74) *Attorney, Agent, or Firm*—Lee & Hayes, PLLC

(57) ABSTRACT

A method includes receiving a name associated with a user on a remote computer, the name including location data and a hash value uniquely associated with a data object representing the user and retrieving the data object from one of a local cache based on the hash value or a location identified by the location data. A system for managing objects representing users in an instant messaging conversation includes a data object representing a user, the data object having an object name including a location identifier and a hash value, the object name allowing, and an object store operable to retrieve the data object from a location identified by the location identifier and store the data object in a local cache based on the hash value.

21 Claims, 8 Drawing Sheets

U.S. PATENT DOCUMENTS

| | | | |
|---|---|---|---|
| 7,171,415 B2 | 1/2007 | Kan et al. | |
| 7,203,356 B2* | 4/2007 | Gokturk et al. | 382/154 |
| 7,302,270 B1 | 11/2007 | Day | |
| 7,353,253 B1 | 4/2008 | Zhao | |
| 7,437,364 B1 | 10/2008 | Fredricksen et al. | |
| 7,437,374 B2 | 10/2008 | Chen et al. | |
| 2001/0003189 A1 | 6/2001 | Miyazawa et al. | |
| 2001/0025280 A1 | 9/2001 | Mandato et al. | |
| 2002/0010746 A1 | 1/2002 | Jilk, Jr. et al. | |
| 2002/0036990 A1 | 3/2002 | Chodor et al. | |
| 2002/0065931 A1 | 5/2002 | Goodwin, III et al. | |
| 2002/0077135 A1 | 6/2002 | Hyon | |
| 2002/0107925 A1 | 8/2002 | Goldschneider et al. | |
| 2002/0178230 A1 | 11/2002 | Aggarwal et al. | |
| 2002/0184309 A1 | 12/2002 | Danker et al. | |
| 2002/0184311 A1 | 12/2002 | Traversat et al. | |
| 2002/0194006 A1 | 12/2002 | Challapali | |
| 2003/0065721 A1 | 4/2003 | Roskind | |
| 2003/0131098 A1 | 7/2003 | Huntington et al. | |
| 2003/0177184 A1 | 9/2003 | Dickerman et al. | |
| 2003/0177485 A1 | 9/2003 | Waldin, Jr. et al. | |
| 2003/0208543 A1 | 11/2003 | Enete et al. | |
| 2003/0217099 A1 | 11/2003 | Bobde et al. | |
| 2003/0217142 A1 | 11/2003 | Bobde et al. | |
| 2003/0222907 A1* | 12/2003 | Heikes et al. | 345/745 |
| 2003/0225846 A1* | 12/2003 | Heikes et al. | 709/207 |
| 2003/0225848 A1* | 12/2003 | Heikes et al. | 709/207 |
| 2004/0018858 A1 | 1/2004 | Nelson | |
| 2004/0070567 A1 | 4/2004 | Longe et al. | |
| 2004/0098502 A1* | 5/2004 | Xu et al. | 709/238 |
| 2004/0153517 A1 | 8/2004 | Gang et al. | |
| 2004/0162877 A1 | 8/2004 | Van Dok et al. | |
| 2004/0268236 A1 | 12/2004 | Chidlovskii et al. | |
| 2005/0004993 A1* | 1/2005 | Miller et al. | 709/207 |
| 2005/0027839 A1 | 2/2005 | Day et al. | |
| 2005/0273472 A1 | 12/2005 | Reddy et al. | |
| 2006/0015560 A1* | 1/2006 | MacAuley et al. | 709/206 |

FOREIGN PATENT DOCUMENTS

| | | |
|---|---|---|
| WO | WO 01/71992 | 9/2001 |
| WO | WO 01/93503 A | 12/2001 |
| WO | WO 2004/004139 | 1/2004 |
| WO | WO2005017660 | 2/2005 |

OTHER PUBLICATIONS

U.S. Appl. No. 10/987,396; Zlateff, et al.; filed Nov. 12, 2004.
U.S. Appl. No. 11/111,532; Zlateff, et al.; filed Apr. 21, 2005.
"New Tunneling Techniques", Cisco Systems, available online at <<www.cisco.com>>, accessed Jun. 6, 2003, 3 pages.
"The ABC's of IP Version 6: Understanding the Essentials Series", Cisco Systems, available at <<www.cisco.com/go/abc>>, 74 pages.
Rosenberg, et al., "STUN-Simple Traversal of User Datagram Protocol (UDP) Through Network Address Translators (NATs)", Request for Comments: 3489, Network Working Group, Mar. 2003, pp. 1-32, the Internet Society.
Campbell B. et al. "Instant Message Sessions in Simple", Internet-Draft, Jun. 30, 2003.
Handley, M. "Germ: Generic RTP Multiplexing" Internet Engineering Task Force, XX, XX, Nov. 1, 1998, pp. 1-7.
"AOL Instant Messenger homepage", America Online, retrieved on Nov. 8, 2005 at <<[http://www.aim.com/>>, p. 1.
"MSN Messenger Version 7.5", Microsoft Corporation of Redmond, retrieved on Nov. 8, 2005 at <<http://messenger.msn.com/Xp/Default.aspx>>, pp. 2.
"Yahoo! Messenger with Voice—Chat, Call, Share Photos, and More", retrieved on Nov. 8, 2005 at <<http://messenger.yahoo.com/?ovchn=GGL&ovcpn=US_Can_Branded-Generic&ovcrn=yahoo+messenger&ovtac=PPC>>, pp. 2.
Aaron of Borg, "Yahoo Messenger 5.5 Hidden Smileys", retrieved Jun. 7, 2008 at <<http://www.eeggs.com/items/36761.html>>, The Easter Egg Archive, Version 5.5, pp. 1-2.
Borger, et al, "IP over SCI", IEEE, 2000, pp. 73-77.
Copeland, "E-mail's Signature Smiley Face is Long in the Tooth", retrieved Jun. 8, 2008 at <<http://www.pittsburghlive.com/x/pittsburghtrib/s_92452.html>>, Pittsburgh Tribune Review, Sep. 20, 2002, pp. 1-3.
"Must Read: Signature/Avatar Rules", retrieved Jun. 7, 2008 at <<http://web.archive.org/web/20031002014646/forums.allalias.com/index/php?>>, AllAlias.com, May 23, 2003, pp. 1-8.
"Smiley Emoticons", retrieved Jun. 7, 2008 at <<http://www.ultimatemetal.com/forum/power-omens/46652-smiley-emoticons.html>>, Ultimate Metal Forum, Sep. 5, 2002, pp. 1-9.
"Trillian Emoticons", retrieved Jun. 8, 2008 at <<http://www.bigblueball.com/forums/trillian/14101-trillian-emoticons.html>>, BigBlueBall Forums, pp. 1-6.
"Yahoo Messenger 5.5 Hidden Smileys", retrieved Jun. 7, 2008 at <<http://www.eeggs.com/items/36761.html>>, The Easter Egg Archive, Version 5.5, pp. 1-2.
"Yahoo! Emoticons for Yahoo Messenger & Java Chat Applet" retrieved Jun. 7, 2008 at <<http://syntetica.eng.uci.edu/>>, Synthetica, pp. 1-7.

* cited by examiner

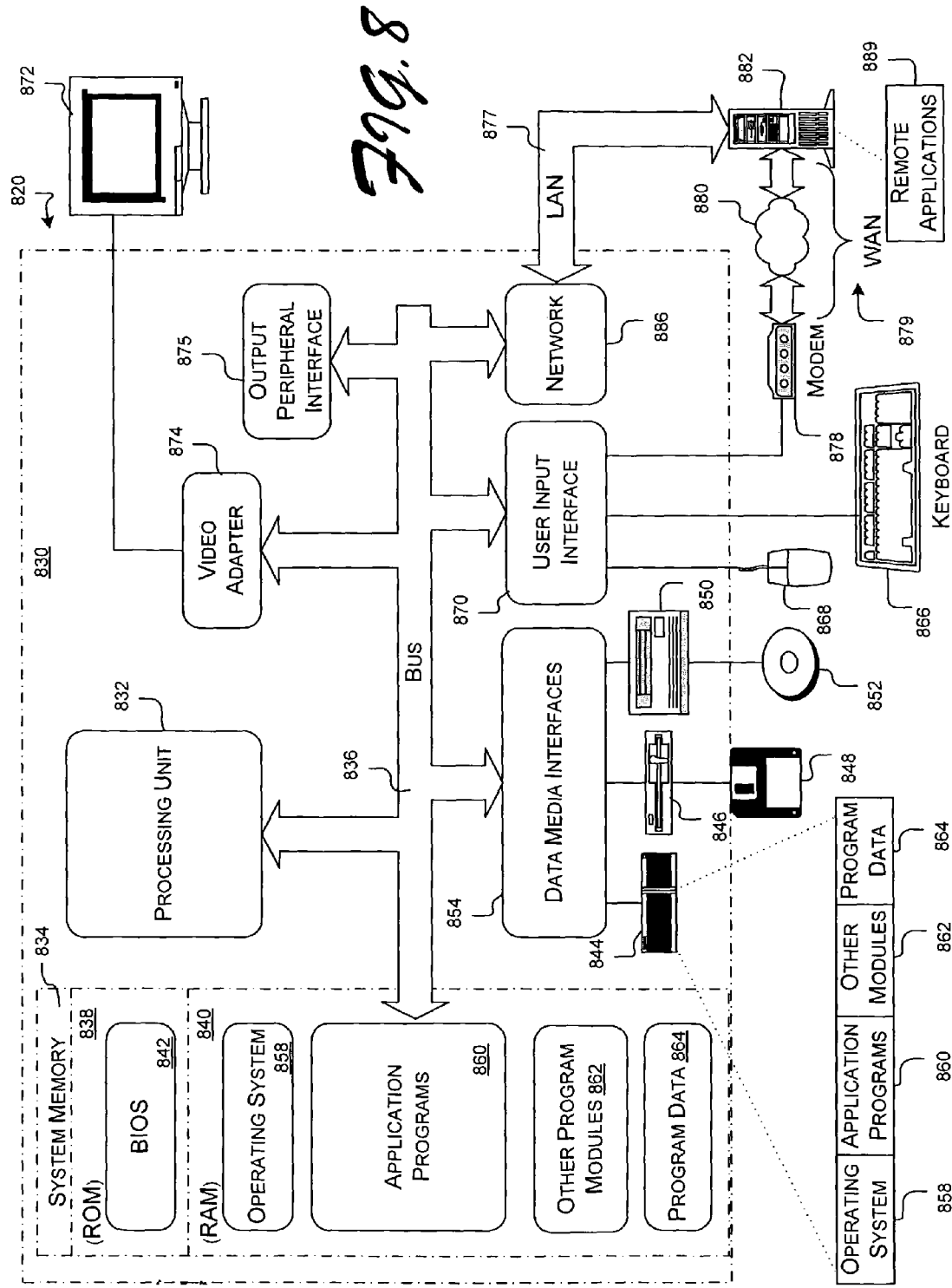

INSTANT MESSAGING OBJECT STORE

CROSS-REFERENCE TO RELATED APPLICATION

The present application is related to co-pending U.S. patent application Ser. No. 10/611,575, entitled "Transport System for Instant Messaging," by John Holmes, David Michael Miller, and Walter vonKoch. which is filed concurrently herewith, assigned to the assignee of the present application, and incorporated herein by reference for all that it teaches and discloses.

TECHNICAL FIELD

The described subject matter relates to computer communications. More particularly, the subject matter relates to an object store for instant messaging.

BACKGROUND

Instant messaging is becoming a very popular communications tool for users of computer devices. An instant messaging (IM) application (e.g., WINDOWS® Messenger system of Microsoft Corporation of Redmond, Wash., Yahoo! Messenger, AOL instant messenger (AIM), and the like) enables a user to engage in a real time conversation with one or more contacts, who are identified in the user's private list of contacts. Typically, private lists are stored on a server, such as a switchboard, or relay server, through which a conversation is established. The switchboard server then routes inbound messages to the appropriate recipients.

As instant messaging systems advance, they can provide more features that make the instant messaging conversation a richer experience. Such features operate on various types of data objects, in addition to text. For example, a custom user tile feature allows a user to generate and transmit a custom user tile that uniquely represents the user on another user's computer. Transmission of such feature objects typically requires a higher bandwidth, than text, to appear error-free to the recipient. In addition, objects that represent a user during a conversation typically will change infrequently compared to how often such objects are accessed.

Unfortunately, traditional instant messaging applications do not provide mechanisms to efficiently manage feature objects while preventing tampering of such objects. For example, if a user were to simply send his/her unique custom user tile to a second user, the second user could change the first user's tile so that the tile no longer represents the first user in the way he/she wants to be represented.

SUMMARY

Exemplary implementations are described that solve the above problems and other problems.

One implementation includes a method for communicating object data by receiving a name associated with a user on a remote computer, the name including location data and a hash value uniquely associated with a data object representing the user and retrieving the data object from one of a local cache based on the hash value or a location identified by the location data.

Another implementation includes a system for managing objects that represent users in an instant messaging conversation, wherein the system includes a data object representing a user, the data object having an object name including a location identifier and a hash value, the object name allowing, and an object store operable to retrieve the data object from a location identified by the location identifier and store the data object in a local cache based on the hash value.

BRIEF DESCRIPTION OF THE DRAWINGS

FIG. 8 illustrates an exemplary system that provides a suitable operating environment to engage in an instant messaging conversation using an object store to manage feature objects.

DETAILED DESCRIPTION

Figure 1:
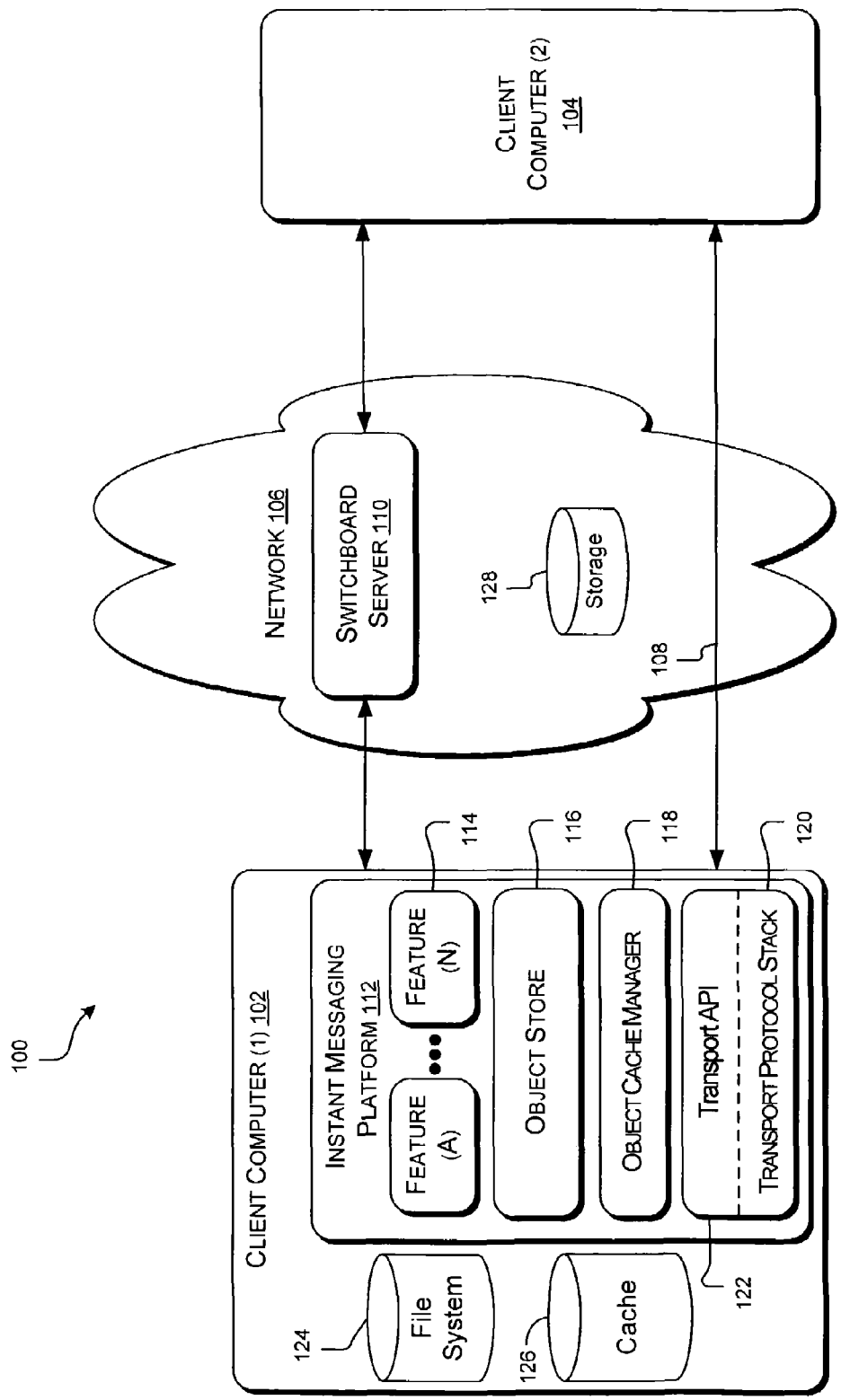
FIG. 1 illustrates an exemplary network environment for an instant messaging conversation utilizing an object store.

Turning to the drawings, wherein like reference numerals refer to like elements, various methods are illustrated as being implemented in a suitable computing environment. Although not required, various exemplary methods will be described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods, may be practiced with other computer system configurations, including handheld devices, multi-processor systems, microprocessor based or programmable consumer electronics, network PCs, mini-computers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Overview

Exemplary methods, systems, and devices are disclosed for managing objects in an instant messaging system. Generally, an object store provides a write-once, read-many object storage and retrieval system, wherein the objects are immutable. The object store provides an interface through which a feature application can store or retrieve an object using an object name. The object store encodes the object data to create a unique identifier, through which the object store can access the object from a local cache, or from one of a plurality of locations. The object may be stored locally or remotely. The object store can decode the object's name to obtain location and/or creator information to retrieve the object from the local or remote storage.

Exemplary Systems for Storing Objects in an Instant Messaging Scenario

FIG. 1 illustrates an exemplary network environment 100 for an instant messaging conversation. Generally, two clients 102 and 104 can communicate with each other via a network 106 or directly, via a direct connection 108. A switchboard server 110 facilitates communication between client (1) 102 and client (2) 104 via the network 106. The client (1) 102 and/or the client (2) 104 can connect to the switchboard server 110 to establish an instant messaging session. Using the direct connection 108, data need not be routed through the switchboard server 110, but rather, the data may be communicated in a peer-to-peer fashion between client (1) 102 and client (2) 104.

An instant messaging (IM) platform 112 enables the client (1) 102 and the client (2) 104 to engage in an instant messaging conversation. A user of the IM platform 112 interacts with the IM platform 112 via a user interface (not shown) to send and receive messages, and other data, to and from the client (2) 104. The IM platform 112 includes one or more features 114 (also called end user features (EUFs)), an object store 116, an object cache manager 118, and a transport protocol stack 120. The transport protocol stack 120 provides an application programming interface (API) 122 whereby higher level functions, such as the features 114 and the object store 116 can use functions in the transport protocol stack 120 to send and receive data.

In general, the transport protocol stack 120 and the transport API 122 provide means for client (1) 102 to communicate with client (2) 104 over the network 106 and/or over the direct connection 108 in a peer-to-peer fashion. The transport protocol stack 120 establishes necessary connections for communicating instant messaging data, including data related to the features 114 and the object store 116. Exemplary implementations of the transport protocol stack 120 and transport API 122 are described in further detail in co-pending U.S. patent application Ser. No. 10/611,575, entitled "Transport System for Instant Messaging."

The features 114 are functions or applications hosted or executed by or within the IM application 112 to present data associated with the feature 114. A feature 114 may be characterized by the type of data the feature 114 presents, the manner of presenting the data, the operations that the feature 114 may perform on the data, and/or the interactive options that the feature 114 provides to the user to interact with the data. For example, a custom user tile feature 114 presents picture data in a screen tile on the user interface; a file transfer feature 114 enables a user to select a file and send the file to an instant messaging contact. By way of example, but not limitation, the features 114 may include custom emoticons, ink, embedded pictures, and other applications.

The features 114 use objects during an instant messaging conversation to present data. Objects are managed by the object store 116. The object store 116 provides methods and data for storing, accessing, and otherwise managing data objects used in instant messaging. For example, the object store 204 may be used by a custom emoticon feature 114 to display a custom emoticon from the client (2) 104 at the client (1) 102. As discussed in further detail below, the object store 116 can provide degrees of data security by encrypting data, such as by hashing identifier data associated with an object.

The client computer (1) 102 includes a file system 124 and a cache 126. Objects can be stored in both the file system 124 and the cache 126. The file system 124 is a standard computer file system for cataloging files in the client computer (1) 102. The cache 126 includes memory, such as hard or floppy disk, and/or Random Access Memory (RAM). The object cache manager 118 manages objects in the cache 126.

One implementation of the object cache manager 118 uses the WinINET® cache, which is the cache used by the Internet Explorer® from Microsoft® Corporation. In this implementation, when an object is retrieved from a web address (e.g., a uniform resource locator (URL)), WinINET® will automatically write the object into the WinINET® cache. If an object is retrieved from a location other than a URL location, the object cache manager 118 will request that the transport protocol stack 120 retrieve the object, and the object cache manager 118 writes the object to the WinINET® cache.

The network 106 includes storage 128, which can also hold object data that can be used by the clients 102 and 104. The client (1) 102 may access network storage 128 to retrieve an object via the network 106. Objects on the client (1) 102 can be retrieved and used by the client (2) 104, and vice versa. As is discussed in further detail below, the object store 116 handles requests for objects, by determining where the requested objects are and retrieving them from the determined locations. Thus, as shown in FIG. 1, the object store 116 can determine that objects are in a local cache 126, in a local file system 124, in network storage 128, and/or on a remote client (2) 104.

Although they are not shown, modules analogous to those included on the client (1) 102 are included on the client (2) 104. Thus, the client (2) 104 includes a messenger platform, features, an object store, an object cache manager, a transport protocol stack, a file system, and cache memory.

Although the exemplary environment 100 in FIG. 1 depicts only two clients 102 and 104 in a conversation, it is to be understood that more than two clients may be involved in a conversation. Two or more clients may communicate in a multipoint fashion, wherein each client may have a connection (e.g., peer-to-peer, or through a server) to two or more other clients. More detailed descriptions of exemplary operations and systems that may be employed in the network environment 100 are provided below.

Figure 2:
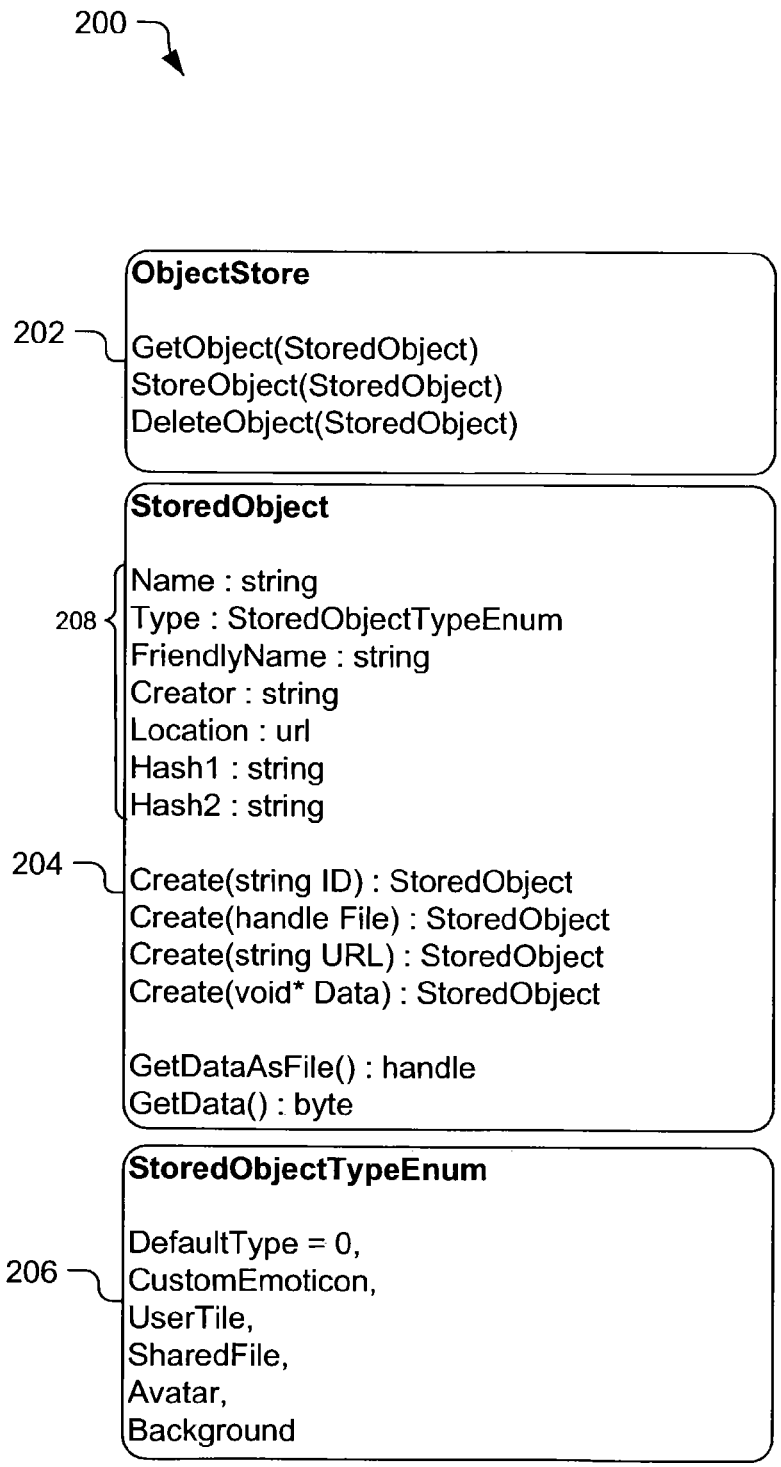
FIG. 2 is a class diagram having exemplary classes that may be instantiated in a messenger platform to provide an object store for object management.

FIG. 2 illustrates a class diagram 200 having exemplary classes that may be instantiated in a messenger platform (e.g., the IM platform 112, FIG. 1) to provide object management. One class is an ObjectStore class 202 representing an object store (e.g., the object store 116, FIG. 1) on a client computer (e.g., the client (1) 102, FIG. 1). The ObjectStore class 202 uses a StoredObject class 204 that represents a stored object. A type enumerator 206 defines one or more types of objects. Those skilled in the art will be familiar with object oriented software design and class diagram designs, such as the class diagram 200 in FIG. 2.

Features (e.g., the features 114, FIG. 1) in a messenger application (e.g., the IM platform 112, FIG. 1) interface with the ObjectStore class 202 (or an instance of the ObjectStore class 202) to store and retrieve instances of the StoredObject class 204. In a particular implementation, the ObjectStore class 202 is a static singleton, which means that only one instance of the ObjectStore class 202 is created to handle requests from all the features that may be executing.

Exemplary object types are provided in the StoredObjectTypeEnum 206. As shown, in the particular implementation of FIG. 2, the enumerated types are custom emoticon, user tile, background, avatar, and shared file. The types may refer to objects that a user can generate that represent the user. The user may create an object, such as a custom emoticon, an avatar, or a user tile, that is unique to the user.

As shown in FIG. 2, the ObjectStore class 202 provides three functions: GetObject(StoredObject), StoreObject (StoredObject), and DeleteObject(StoredObject). As the function names indicate, a feature can retrieve a stored object by calling the GetObject function, store an object by calling the StoreObject function, and delete an object by calling the DeleteObject function. Each of the functions includes a parameter of the type StoredObject class 204.

The StoredObject class 204 refers to an object of data. Data in an object is composed of any Binary Large Objects (BLOB) of data of any size or type. An instance of the Stored Object class 204 need not be stored with the object data to which the instance refers. For example, client (1) 102 (FIG. 1) may have an instance of a StoredObject 204 that refers to object data that is stored on network storage 128 (FIG. 1) or another client, such as client (2) 104 (FIG. 1). The actual location of the object data is transparent to a feature using instances of the ObjectStore class 202 and the StoredObject class 204.

The StoredObject class 204 includes object metadata 208 that describes the object data. The exemplary metadata 208 includes a name field, a Type field, a FriendlyName field, a Hash1 field, a Hash2 field, a Creator field, and a Location field. The name is a string that identifies the object. In one embodiment, the name field is a combination of one or more of the metadata 208 fields. The Type field is one of the types in the StoredObjectTypeEnum 206 that specifies the type of object. The FriendlyName field is a user-readable name that a user can give the object.

In one embodiment, the Hash1 field has a value uniquely associated with the object data, and may be used to locate the object data in a cache. The Hash1 value is generated using a cryptographic hashing function, such as a Secure Hash Algorithm 1 (SHA1). The SHA1 function takes the object data as input to generate the Hash1 value. An example calling signature of the SHA1 function is SHA1(Data) where Data refers to the object data to be stored.

SHA1 is an algorithm for computing a 'condensed representation' of the object data. The 'condensed representation' is of fixed length and is known as a 'message digest' or 'fingerprint'. A common fixed length of the Hash1 field is 160 bits, which virtually guarantees that the Hash1 value will be unique for every object. The uniqueness of the Hash1 value enables the Hash1 value to act as a 'fingerprint' of the object data, to ensure data integrity and allow for data comparison checking. For instance, when object data is downloaded, the Hash1 value can be calculated and compared to a previous Hash1 value to guarantee that the object data is unaltered. The Hash1 value can also be used as an index into a cache to locate the previously stored object data.

The Hash1 value may be calculated using other known algorithms, such as the Message Digest Algorithm 5 (MD5) developed by Professor Ronald L. Rivest. Using MD5, SHA1, or a similar algorithm, the Hash1 value is non-reversible, meaning that the object data cannot be generated from the Hash1 value. For those skilled in the art, resources are readily available for implementing a hashing or message digest algorithm, such as a SHA or an MD. Details of one particular implementation of a SHA1 algorithm are available in "US Secure Hash Algorithm 1 (SHA1)" written by Donald E. Eastlake, III, and Paul E. Jones, and published in Request for Comments 3174 (RFC3174) by The Internet Society (September, 2001). Also, Federal Information Processing Standards Publication (FIPS PUB) 180-2, Aug. 1, 2002 sets forth a Secure Hash Standard.

The Hash2 field is a hash value that results when the metadata fields (i.e., the Creator field, the Type field, the FriendlyName field, the Location field, and the Hash1 field) are input into a hash function, such as the SHA1 function discussed above.

The Creator field of the StoredObject class 204 represents the user, peer, or client that created the object. The Creator field may be a string having the creator's name, email address, or any other identifier that specifies the creator of the object. The Location field of the StoredObject class 204 specifies the location of the object data. As shown in FIG. 2, the location is given by a uniform resource locator (URL). As is generally known, a URL is an address that defines the route to data on the Web or any other network facility. As discussed in further detail below, the ObjectStore class 202 can use the Creator and the Location fields to retrieve the object data.

An instance of the exemplary StoredObject class 204 provides an overloaded function "Create" function, whereby stored objects may be created of various types. Thus, when the Create function is called with an ID, an object is created having the ID; when the Create function is called with a File handle, an object is created using the referenced File, and so on.

An instance of the StoredObject class 204 has a "GetData( )" function. When the GetData( ) function is called, the object data referenced by the instance of the StoredObject class 204, is returned. Thus, when a feature needs to present the object, the feature can call GetData( ) to obtain the actual data, whether the data define an emoticon, an avatar, a user tile, a file, a background, or otherwise.

Exemplary Operations for Storing and Retrieving an Object Using an Object Store

Figure 3:
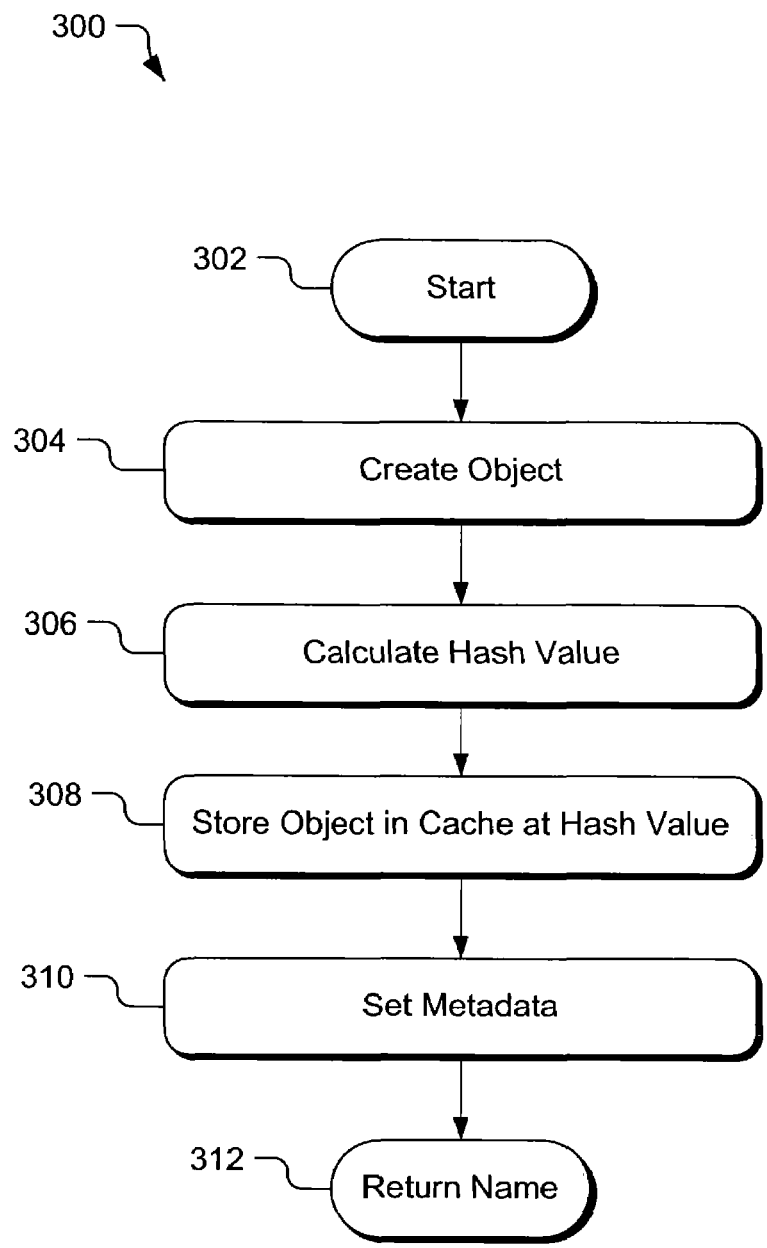
FIG. 3 illustrates a store object operation flow having exemplary operations for creating an object and storing the object using an object store.

FIG. 3 illustrates a store object operation flow 300 having exemplary operations for creating an object and storing the object using an object store, such as the object store 116, FIG. 1, and/or the ObjectStore class 202, FIG. 2. In one scenario, a feature interacts with an instance of an ObjectStore class 202 and a StoredObject class 204 to create and store an object. The feature receives an object name from the object store, which the feature can later use to retrieve the object.

After a start operation 302, a creating operation 304 creates an object. In one implementation of the creating operation 304, an instance of the StoredObject class 204 (FIG. 2) is created. A call is made to a Create( ) function with a reference to the data to be stored. For example, a user can use a custom emoticon feature to create a custom emoticon type StoredObject. The custom emoticon feature calls the Create( ) function with a reference to the custom emoticon.

A calculating operation 306 calculates a first Hash value corresponding to the data associated with the StoredObject (created in the creating operation 304). The calculating operation 306 may calculate a second Hash value based on the metadata fields in the StoredObject. Various resources and algorithms for calculating Hash values are described above, and will not be reiterated here. A storing operation 308 stores the object data in a local cache. The object data is stored at a location in the cache corresponding to the first Hash value, so that the object data can later be easily retrieved from the cache.

A setting operation 310 sets the fields in the metadata (see metadata fields in FIG. 2) of the StoredObject. The Creator field and the Location field of the object metadata can be set based on user login settings. The Type field is set to the type of stored object data. The FriendlyName may be specified by the user. The Hash1 field and the Hash2 field are set to the first Hash value and second Hash value, respectively, calculate in the calculating operation 306.

A returning operation 312 returns an object name. The object name is the concatenation of one or more fields in the metadata, which were set in the setting operation 310. In one implementation, the object name that is returned includes the Creator field and the Location field. The Creator field and the Location field will enable the ObjectStore to later retrieve the object data from a location other than the local cache if necessary.

The name returned in the returning operation 312 may be in a specified format, such as Uniform Resource Identifier (URI) and Uniform Resource Name (URN). A URI is a character string that can identify any kind of resource on the Internet, including images, text, video, audio and programs. A common version of a URI is a Uniform Resource Locator (URL). A URN is defined to be a permanent, globally unique name for an object. An exemplary URI and URN are shown below:

URI: //[Creator]/[Type]/[Hash1]/[Hash2]?fn=[FriendlyName]&URL=[Location];

URN: [Type]: [Creator]: [FriendlyName]: [Location]: [Hash1]: [Hash2]

Figure 4:
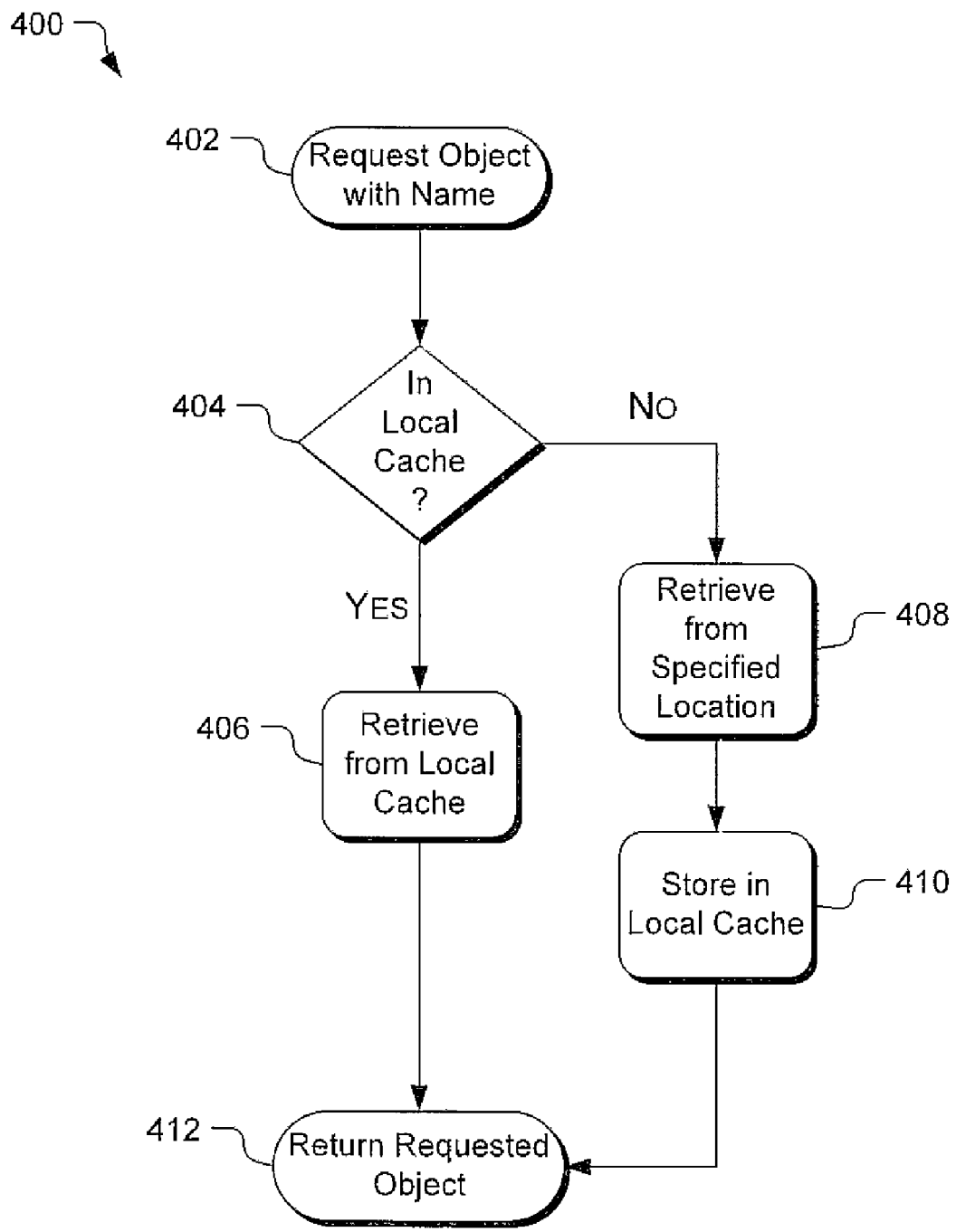
FIG. 4 is a flow chart having exemplary operations for selecting an avatar, inviting another user to have the avatar presented on the user's device, and initializing dedicated resources for presenting the avatar on the user's device.

FIG. 4 is a retrieve object operation flow 400 having exemplary operations for retrieving an object that may be stored at any of various locations on a computer network. As discussed with regard to FIG. 1, objects and object data may be stored in a local cache, in a local file system, in network storage (e.g., on a disk on network server), and/or on a remote client, or peer computer. The operation flow 400 responds to a request for an object by determining where the object is located, and then retrieving the object from that location.

A requesting operation 402 requests object data using an object name, such as the object name returned in the returning operation 310 (FIG. 3). The requesting operation 402 may pass in an object name obtained from a remote client computer, or a network server. The object name is assumed to include location information (e.g., a URL, or Location field in StoredObject 204, FIG. 2) specifying the location of the requested object. The object name also includes a Hash value uniquely related to the requested object. The requesting operation 402 may involve calling the GetObject( ) function of the ObjectStore 202 (FIG. 2).

A query operation 404 determines whether the requested object is in a local cache. In one implementation of the query operation 404, the Hash1 value in the input Name is used to determine if the object is in the local cache. The Hash1 value is a hash of the data associated with the StoredObject. Thus, the Hash1 is based only on the object data to be retrieved, and is independent of any other Name data associated with the object. Because the Hash1 value is a unique index into the cache, the Hash1 value can be used to determine whether the data associated with the Hash1 value is stored in the local cache. If the requested object is determined to be in the local cache, the retrieve object operation 400 branches "YES" to a retrieving operation 406. The retrieving operation 406 uses the Hash value to index into the local cache and retrieve the object data.

The first time an object is accessed, the object data may not be in the local cache. If the requested object is determined not to be in the local cache, the retrieve object operation 400 branches "NO" to a retrieving operation 408. The retrieving operation 408 retrieves the requested object from a location other than the local cache. The location is specified by the Location field in the input Name. Several scenarios are presented below that illustrate how the Location field may be used to retrieve the requested object from a location other than the local cache.

After the requested object is retrieved from a location other than local cache, a storing operation 410 stores the object in the local cache. After retrieving the requested object from the local cache or storing the requested object in the local cache, a returning operation 412 returns the requested object.

Exemplary Object Retrieval Scenarios

Figure 5:
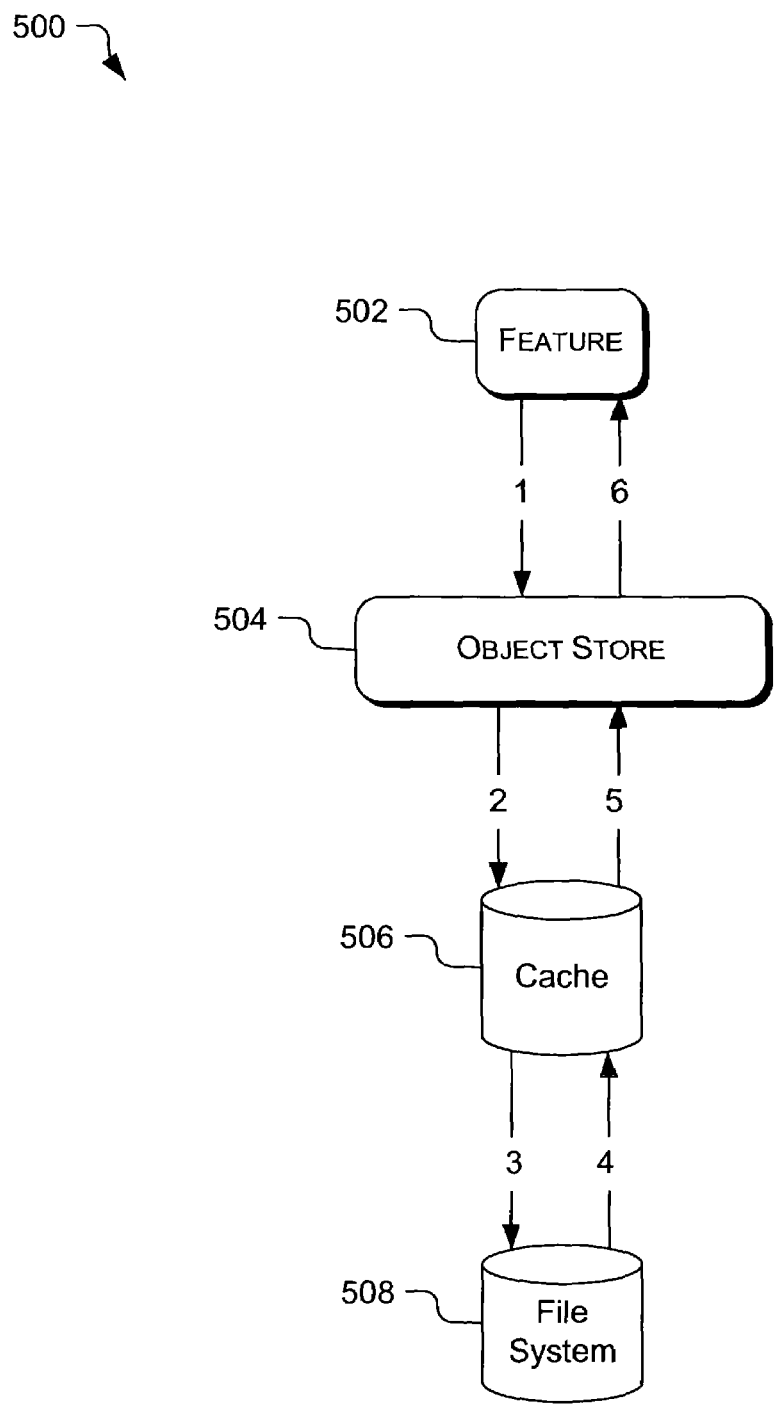
FIG. 5 illustrates an exemplary object retrieval scenario 500 in which requested object data is located in a local file system.

FIG. 5 illustrates an exemplary object retrieval scenario 500 in which requested object data is located in a local file system. A feature 502 requests object data from an object store 504 by passing an object name to the object store 504. The object store 504 determines whether the requested object is in a local cache 506. In the scenario 500, it is assumed the requested object is not found in the local cache 506. The object store 504 parses the object name to determine the location of the requested object data. In the scenario 500, the location data in the object name specifies the location as being a local file system 508.

Thus, the local file system 508 is accessed to retrieve the request object data. The request object data is then stored in the local cache 506 and returned to the requesting feature 502. Thus, as will be appreciated, the exemplary scenario 500 takes place entirely at a single client.

Figure 6:
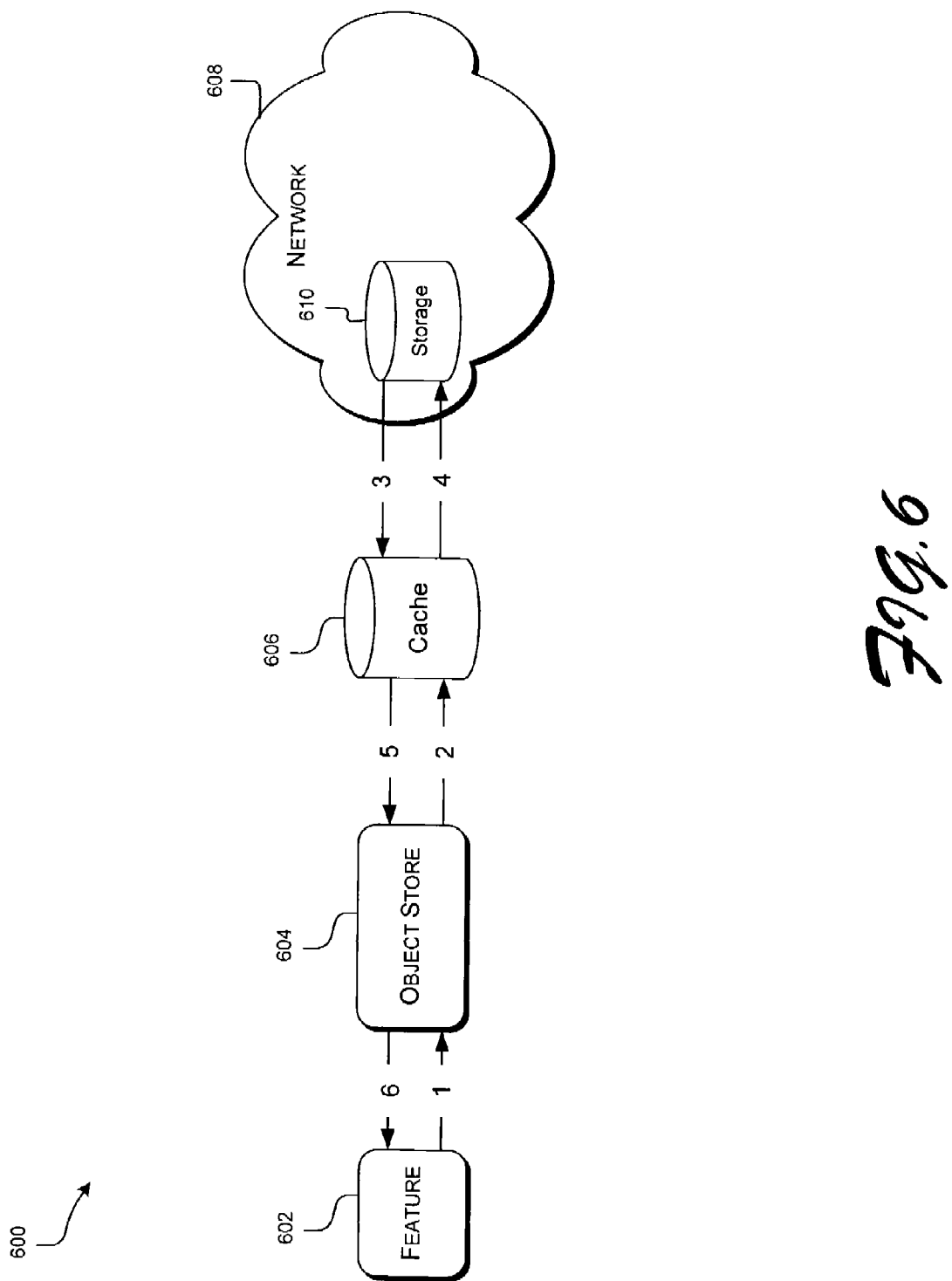
FIG. 6 illustrates another exemplary object retrieval scenario 600 in which requested object data is located on a network storage device.

FIG. 6 illustrates another exemplary object retrieval scenario 600 in which requested object data is located on a network storage device. A feature 602 requests object data from an object store 604 by passing in an object name having a hash value and location information. The object store 604 uses the hash value of the requested object data to determine if the requested object is in a local cache 606. It is assumed in the exemplary scenario that the requested object is not in the local cache 606. The object store 604 determines from the location information that the requested object is stored at a location on a network 608.

The location is given by a URL that designates network storage 610. The requested object is retrieved from the network storage 610. Subsequently, the requested object is stored in the local cache 606 and returned to the requesting feature 602.

Figure 7:
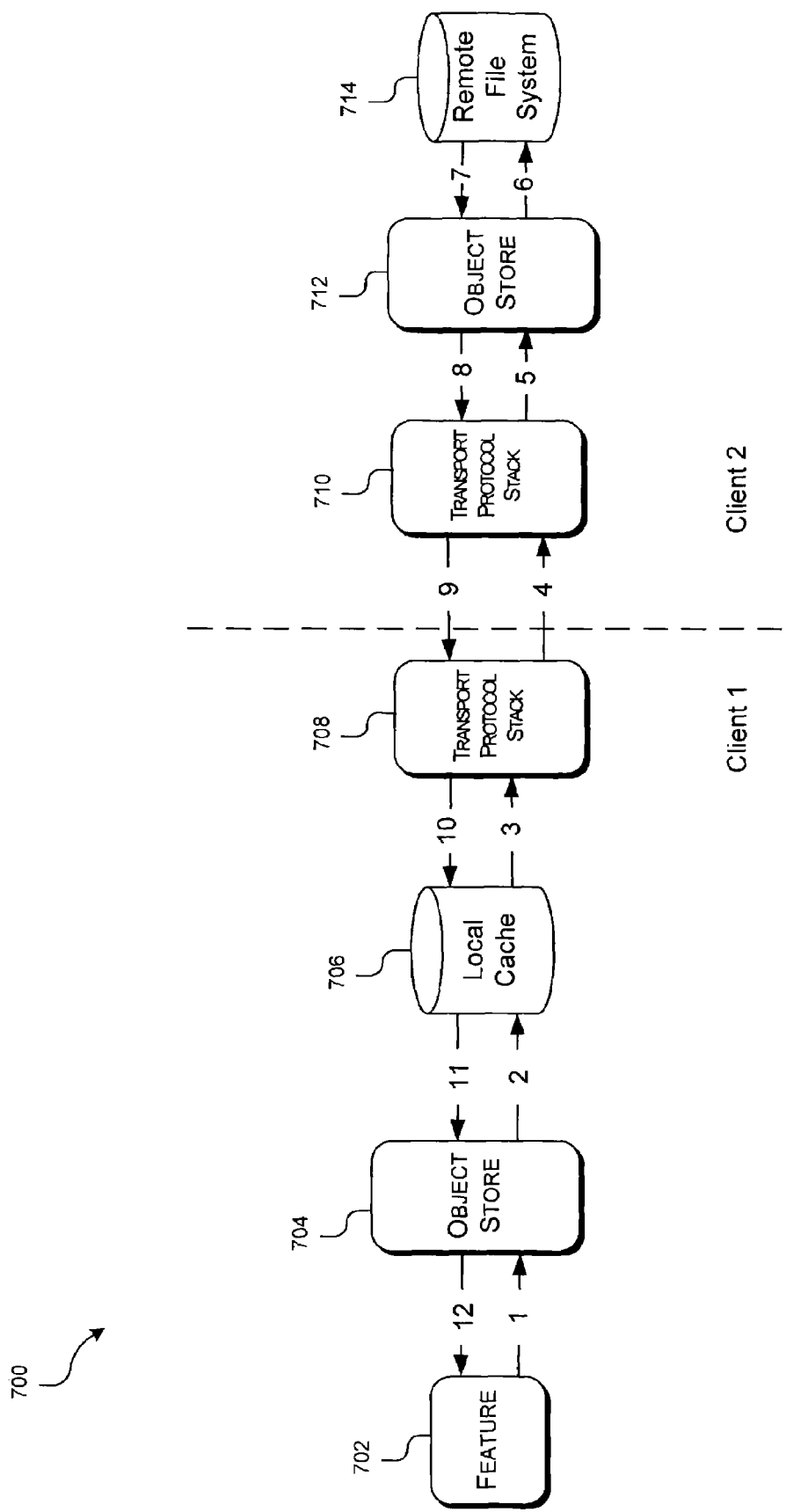
FIG. 7 illustrates another exemplary object retrieval scenario 700 in which requested object data is located at a peer computer.

FIG. 7 illustrates another exemplary object retrieval scenario 700 in which requested object data is located at a peer computer. A feature 702 running on a client, client 1, requests object data from an object store 704 by passing in an object name having a hash value and location data. The object store 704 determines that the requested object data is not in a local cache 706. By parsing the object name, the object store 704 determines that the requested object data is at a client computer, client 2.

A request is sent to a transport protocol stack 706 to retrieve the requested object data from client 2. The transport protocol stack 708 utilizes a peer-to-peer connection to a transport protocol stack 710 on the client 2. A request for the object data is sent to the transport protocol stack 710 on client 2. The transport protocol stack 710 issues a call back to a remote object store 712 on client 2. The remote object store 712 retrieves the requested object data from a remote file system 714 on the client 2.

Subsequently, the requested object data is transmitted from client 2 to client 1 via the transport protocol stacks 708 and 710. At client 1, the request object data is stored in the local cache 706. Thus, later requests for the object data are easily satisfied from the local cache 706 without resorting to a peer-to-peer request. The requested object data is then returned to the requesting feature 702.

An Exemplary Operating Environment

FIG. 8 and the corresponding discussion are intended to provide a general description of a suitable computing environment in which the described arrangements and procedures to store and retrieve objects may be implemented. Exemplary computing environment 820 is only one example of a suitable computing environment and is not intended to suggest any limitation as to the scope of use or functionality of the described subject matter. Neither should the computing environment 820 be interpreted as having any dependency or requirement relating to any one or combination of components illustrated in the exemplary computing environment 820.

The exemplary arrangements and procedures to manage objects in a network environment are operational with numerous other general purpose or special purpose computing system environments or configurations. Examples of well known computing systems, environments, and/or configurations that may be suitable for use with the described subject matter include, but are not limited to, personal computers, server computers, thin clients, thick clients, hand-held or laptop devices, multiprocessor systems, microprocessor-based systems, mainframe computers, distributed computing environments such as server farms and corporate intranets, and the like, that include any of the above systems or devices.

The computing environment 820 includes a general-purpose computing device in the form of a computer 830. The computer 830 may include and/or serve as an exemplary implementation of an object store as described above. The components of the computer 830 may include, by are not limited to, one or more processors or processing units 832, a system memory 834, and a bus 836 that couples various system components including the system memory 834 to the processor 832.

The bus 836 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The computer 830 typically includes a variety of computer readable media. Such media may be any available media that is accessible by the computer 830, and it includes both volatile and non-volatile media, removable and non-removable media.

The system memory includes computer readable media in the form of volatile memory, such as random access memory (RAM) 840, and/or non-volatile memory, such as read only memory (ROM) 838. A basic input/output system (BIOS) 842, containing the basic routines that help to communicate information between elements within the computer 830, such as during start-up, is stored in ROM 838. The RAM 840 typically contains data and/or program modules that are immediately accessible to and/or presently be operated on by the processor 832.

The computer 830 may further include other removable/non-removable, volatile/non-volatile computer storage media. By way of example only, FIG. 8 illustrates a hard disk drive 844 for reading from and writing to a non-removable, non-volatile magnetic media (not shown and typically called a "hard drive"), a magnetic disk drive 846 for reading from and writing to a removable, non-volatile magnetic disk 848 (e.g., a "floppy disk"), and an optical disk drive 850 for reading from or writing to a removable, non-volatile optical disk 852 such as a CD-ROM, DVD-ROM or other optical media. The hard disk drive 844, magnetic disk drive 846, and optical disk drive 850 are each connected to bus 836 by one or more interfaces 854.

The drives and their associated computer-readable media provide nonvolatile storage of computer readable instructions, data, structures, program modules, and other data for the computer 830. Although the exemplary environment described herein employs a hard disk, a removable magnetic disk 848 and a removable optical disk 852, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 848, optical disk 852, ROM 838, or RAM 540, including, by way of example, and not limitation, an operating system 858, one or more application programs 860, other program modules 862, and program data 864. Application programs 860 may include an instant messaging program with feature applications an object store and a transport protocol stack as described herein.

A user may enter commands and information into the computer 830 through optional input devices such as a keyboard 866 and a pointing device 868 (such as a "mouse"). Other input devices (not shown) may include a microphone, joystick, game pad, satellite dish, serial port, scanner, or the like. These and other input devices are connected to the processing unit 832 through a user input interface 870 that is coupled to the bus 836, but may be connected by other interface and bus structures, such as a parallel port, game port, or a universal serial bus (USB).

An optional monitor 872 or other type of display device is connected to the bus 836 via an interface, such as a video adapter 874. In addition to the monitor, personal computers typically include other peripheral output devices (not shown), such as speakers and printers, which may be connected through output peripheral interface 875.

The computer 830 may operate in a networked environment using logical connections to one or more remote computers, such as a remote computer 882. The remote computer 882 may include many or all of the elements and features described herein relative to the computer 830. The logical connections shown in FIG. 8 are a local area network (LAN) 877 and a general wide area network (WAN) 879. The LAN 877 and/or the WAN 879 can be wired networks, wireless networks, or any combination of wired or wireless networks. Such networking environments are commonplace in offices, enterprise-wide computer networks, intranets, and the Internet.

When used in a LAN networking environment, the computer 830 is connected to the LAN 877 via a network interface or an adapter 886. When used in a WAN networking environment, the computer 830 typically includes a modem 878 or other means for establishing communications over the WAN 879. The modem 878, which may be internal or external, may be connected to the system bus 836 via the user input interface 870 or other appropriate mechanism. Depicted in FIG. 8 is a specific implementation of a WAN via the Internet. The computer 830 typically includes a modem 878 or other means for establishing communications over the Internet 880. The modem 878 is connected to the bus 836 via the interface 870.

In a networked environment, program modules depicted relative to the personal computer 830, or portions thereof, may be stored in a remote memory storage device. By way of example, and not limitation, FIG. 8 illustrates remote application programs 889 as residing on a memory device of remote computer 882. It will be appreciated that the network connections shown and described are exemplary and other means of establishing a communications link between the computers may be used.

CONCLUSION

Although the described arrangements, procedures and components have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

We claim:

1. A method of communicating object data requested by an instant messaging application executed on an instant messaging platform, the method comprising:
generating, at a client computing device running the instant messaging application, a unique hash value of a fixed length based on the object data received from a remote user, the object data representing the remote user and comprising metadata descriptive of the object data, wherein the metadata comprises:
a hash field storing the generated hash value;
a location field storing a location identifier indicating a location of the object data other than a location in a local cache of the client computing device; and
a type field indicating an object type which has been previously selected by the remote user to uniquely represent the remote user during future sessions of the instant messaging application;
storing the object data at a location in the local cache of the client computing device, wherein the location of the object data in the local cache corresponds to the hash value; and
returning an object name of the object data to the instant messaging application, the object name comprising the hash value and the location field and enabling access of the object data in the local cache by the instant messaging application without a portion of the object data being altered at the client computing device.

2. The method as recited in claim 1, further comprising;
receiving a request for the object data from the instant messaging application, the request including the object name; and
retrieving the object data from the local cache of the computing device, wherein the object data is located based on the hash value in the object data.

3. The method as recited in claim 1, further comprising:
receiving a request for the object data from the instant messing application, the request including the object name; and
retrieving the object data from the location using the location identifier.

4. The method as recited in claim 1, further comprising:
receiving a request for the object data from the instant messing application, the request including the object name;
determining whether the requested object data is in the local cache of the client computing device based on the hash value;
retrieving the object data from the local cache if the requested object data is in the local cache of the client computing device;
retrieving the requested object data from the location identified by the location identifier.

5. The method as recited in claim 4, wherein the retrieving the requested object data from the location identified by the location identifier comprises:
retrieving the requested object data from network storage.

6. The method as recited in claim 4, wherein the retrieving the requested object data from the location identified by the location identifier comprises:
retrieving the requested object data from a local file system within the local client computing device.

7. The method as recited in claim 4, wherein the retrieving the requested object data from the location identified by the location identifier comprises:
retrieving the requested object data from a file system remote of the client computing device.

8. The method as recited in claim 7, wherein the retrieving the requested object data from the file system remote of the client computing device comprises:
accessing the file system via a peer-to-peer connection.

9. The method as recited in claim 7, wherein the retrieving the requested object data from the file system remote of the client computing device comprises:
accessing the file system via a connection through a switchboard server.

10. A computer-readable storage medium having computer-executable instructions stored thereon that, when executed by one or more processors in a client computer, cause the client computer to perform a method comprising:
receiving, at the client computer, a name associated with a user on a remote computer from an instant messaging application executed on the client computer, the name comprising location data and a hash value uniquely associated with a data object received by and representing the user on the remote computer, the data object comprising metadata descriptive of the object data, wherein:
generating, at the client computer, the hash value to compute a condensed representation of the data object associated with the user on the remote computer;
the hash value identifying a location of the data object in a local cache of the client computer;
the location data in the name indicating a location of the data object other than the location in the local cache identified by the hash value; and the metadata comprises:
  a hash field storing the hash value;
  a location field storing a location identifier indicating the location data in the name; and
  a type field indicating an object type which has been previously selected by the user to uniquely represent the user on the remote computer during future sessions of the instant messaging application; and
  retrieving the data object associated with the name, the retrieving comprising:
    determining whether the data object is in the local cache of the client computer based on the hash value;
    retrieving the data object from the local cache; and
    retrieving the data object from the location identified by the location data if the data object is not in the local cache.

11. The computer-readable medium as recited in claim 10, wherein the retrieving the data object from the local cache comprises:
  retrieving the data object from the local cache based on the hash value.

12. The computer-readable medium as recited in claim 10, wherein the retrieving the data object from the location identified by the location data comprises retrieving the data object from a file system remote of the client computer.

13. The computer-readable medium as recited in claim 10, wherein the retrieving the data object from the location identified by the location data comprises retrieving the data object from a local file system of the client computer.

14. The computer-readable medium as recited in claim 10, wherein the retrieving the data object from the location identified by the location data comprises retrieving the data object from a network storage.

15. The computer-readable medium as recited in claim 10 wherein the retrieving the data object from the location identified by the location data comprises accessing a remote computer via a peer-to-peer connection.

16. A system, implemented at a client computer, for managing a data object representing a remote user on a remote client computer in an instant messaging conversation between the client computer and the remote client computer, the system comprising:
  one or more processors; and
  memory coupled to the one or more processors, the memory having instructions stored thereon, wherein the one or more processors cause the instructions to implement:
    the data object representing the remote user on the client computer, the data object being received by the client computer from the remote client computer, and comprising metadata descriptive of the data object, wherein the metadata comprises:
      a hash field storing a hash value generated, by the client computer, to identify a location in a local cache of the client computer in which the data object is to be stored;
      a location field storing a location identifier indicating a location in the remote client computer in which the data object has been stored;
      a name field storing an object name comprising the hash value and the location identifier of the data object; and
      a type field indicating an object type which has been previously selected by the remote user on the remote client computer to uniquely represent the remote user during future sessions of the instant messaging conversation; and
    a data object store operable to:
      retrieve the data object from the remote client computer through the location identified by the location identifier; and
      store the retrieved data object in the local cache of the client computer based on the hash value.

17. The system as recited in claim 16, wherein the object name further comprises a creator identifier identifying a creator of the data object.

18. The system as recited in claim 16, further comprising a transport protocol stack enabling the object store to retrieve the data object from the remote client computer over a peer-to-peer connection between the client computer and the remote client computer.

19. The system as recited in claim 16, wherein the metadata further comprises:
  a friendly name field storing a friendly name of the data object; and
  a second hash value based on the metadata comprising the hash value, the location identifier, the object name, the object type, the creator identifier, and the friendly name of the data object.

20. The system as recited in claim 16, wherein the location identifier comprises a uniform resource locator (URL).

21. The system as recited in claim 16, wherein the location identifier comprises a uniform resource identifier (URI).

* * * * *